No. 740,530. PATENTED OCT. 6, 1903.
C. B. CLARK.
COMBINED HEATING AND LIGHTING APPARATUS.
APPLICATION FILED MAY 18, 1903.
NO MODEL.
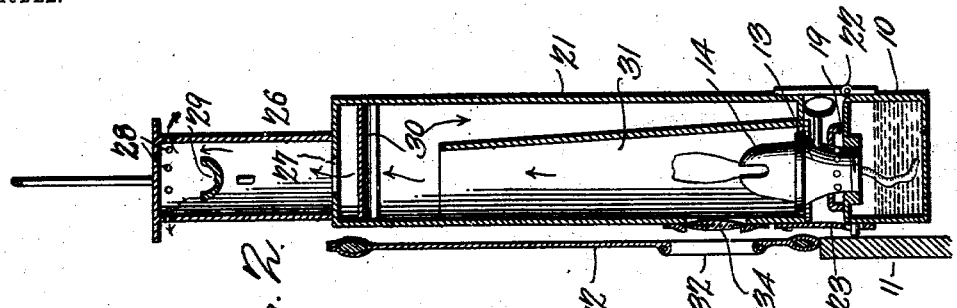
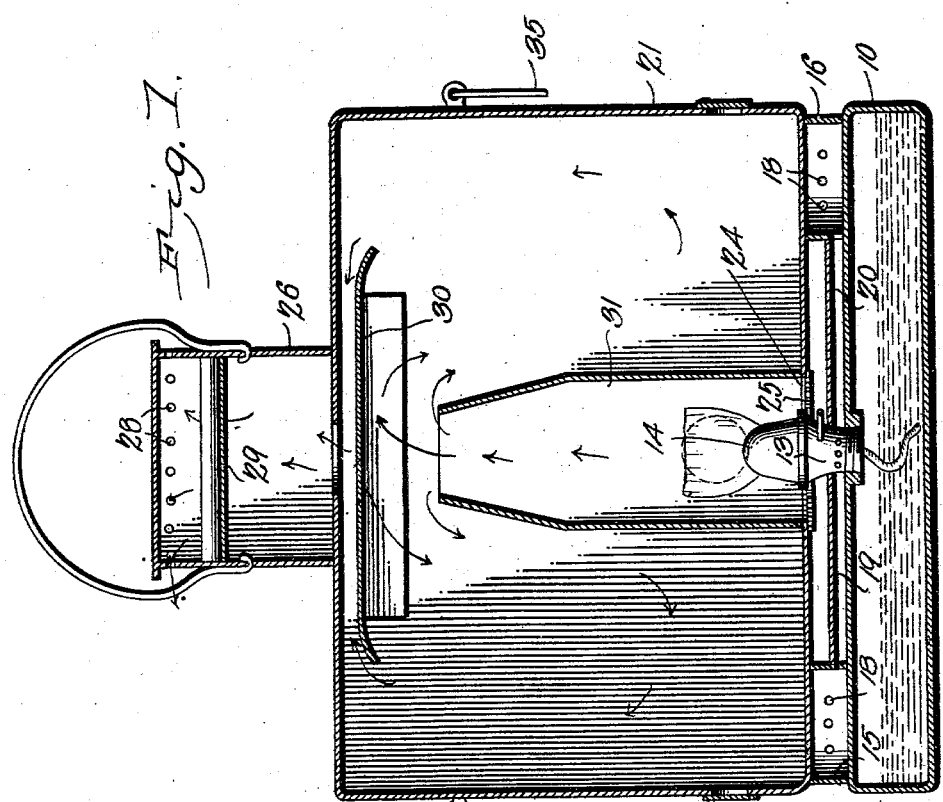

No. 740,530. Patented October 6, 1903.

UNITED STATES PATENT OFFICE.

CASTLE BANKS CLARK, OF PIEDMONT, ALABAMA.

COMBINED HEATING AND LIGHTING APPARATUS.

SPECIFICATION forming part of Letters Patent No. 740,530, dated October 6, 1903.

Application filed May 18, 1903. Serial No. 157,690. (No model.)

*To all whom it may concern:*

Be it known that I, CASTLE BANKS CLARK, a citizen of the United States, residing at Piedmont, in the county of Calhoun and State of Alabama, have invented a new and useful Combined Heating and Lighting Apparatus, of which the following is a specification.

This invention relates to improvements in devices employed for imparting heat and light, and is more particularly adapted for use in connection with buggies, carriages, and similar vehicles, but which may likewise be adapted for other purposes, and I do not, therefore, wish to be limited in its use to any specific locality or in connection with any specific structure, but reserve the right to its use in connection with any structure or for any purpose to which it is adapted.

For the purpose of illustration the device is shown applied to a conventional form of vehicle-dashboard, and in the drawings thus employed corresponding parts are employed to denote like designating characters in both the figures.

Figure 1 represents a longitudinal sectional elevation, and Fig. 2 a transverse sectional elevation, of the device applied.

The improved device consists of a reservoir 10 for the oil and which will preferably be oblong in shape and located above the floor of the vehicle box or body 11 and adjacent to the dashboard 12, as shown.

Rising from the reservoir 10 is a lamp-burner 13 of approved pattern and provided with the "bell" 14 of the usual form.

Located upon the reservoir 10 at each side of the burner are small air-feed drums 15 16, open at the top and provided with a plurality of transverse apertures 17 18, and leading from these drums are ducts 19 20, connecting the burner with the feed-drums and so disposed relative thereto that all the air-supply for the burner below the bell will be supplied through the small drums 15 16 and ducts 19 20, as indicated by the arrows in Fig. 1.

Located above the reservoir 10 is a relatively large radiating-drum 21, connected movably to the reservoir 10, as by hinges 22, and resting by its bottom upon the upper edges of the small air-feed drums 15 16 and forming closures thereto, as shown in Fig. 1.

The free side of the radiating-drum 21 will be connected detachably to the reservoir 10 by spring-catches 23, the radiating-drum and its attachments being thus adapted to be folded over to give free access to the burner.

The bell portion 14 of the burner 13 extends into the drum 21 through a relatively large aperture 24, so that provision is made for the free entrance of the air, and to protect the burner from too strong draft or gusts of wind the aperture is covered with a perforated guard-plate 25, the guard-plate being preferably attached to the burner, as indicated.

Extending above the radiating-drum 21 is a dome 26, with a relatively small aperture 27 between the dome and the radiating-drum and with spaced transverse apertures 28 in the walls of the dome near its top, as shown.

Within the dome 26, just below the apertures 28, is a deflecting-plate 29, preferably curving downwardly, and within the drum 21, just below the aperture 27, is a deflecting-plate 30, preferably with downwardly-turned ends, as shown in Fig. 1.

Within the radiating-drum 21 is located a chimney-like structure 31, surrounding the aperture 24 and extending to a point just beneath the deflecting-plate 30 and preferably contracted toward the upper end, as shown. By this arrangement the air flowing in through the aperture 24 and the perforations in the plate 25 will when heated rise against the plate 30 and be thereby deflected into the drum outside the chimney 31 and be retarded in its passage and the heat radiated through the walls of the drum into the surrounding atmosphere. The surplus air passes through the aperture 27 into the dome 26, where it is again retarded and caused to take a circuitous route by the plate 29, so that the largest possible radiation will be secured and the waste of heat reduced to a minimum. The plates 29 30 and dome 26 likewise serve as a protection to the flame of burner from air-currents and gusts of wind and coact with the plate 25 to secure this result, so that no matter how hard the wind may blow the burner-flame will not be affected thereby.

The dashboard 12 is provided with an aperture 32, and the adjacent wall of the radiating-drum 21 is provided with a corresponding aperture located opposite the aperture 32 and provided with a transparent covering 34, preferably in the form of a lens or "bull's-eye," as shown, the apertures and bull's-eye being located in alinement with the flame of the burner 13, as shown. By this means the light radiating from the heating medium will be utilized as a "headlight" for the vehicle.

The device will be attachable to the dashboard or vehicle-body in any desired manner, such as by hooks 35 or other suitable fastenings, so that it can be readily detached when not required.

In using the device upon vehicles the lap-robe can be wrapped around the drum 21, leaving the dome 26 extending for ventilation, so that the heat will be utilized where most required beneath the robe.

The device may likewise be employed in stores, offices, and dwellings, where a temporary or limited amount of heat is required, and will be found of great advantage in many localities where a permanent heater is not available.

Having thus described the invention, what I claim is—

1. In a device of the class described an oil-reservoir, a heating-drum mounted thereon and spaced therefrom, a burner attached to said reservoir and extending into said drum and having transverse perforations opening into the space between the drum and reservoir, an air-chamber disposed in the space between said drum and reservoir and having perforated walls, and a duct leading from said chamber to said burner.

2. A heating device consisting of an oblong drum having an opening in its bottom and one in its top, a burner extending through said bottom opening into said drum, a chimney disposed in said drum around said burner, a deflecting-plate mounted in said drum between said chimney and the aperture in the top of the drum, said plate having the edges thereof downturned, a dome mounted on said drum over said top opening and having transverse perforations in the side walls thereof near its top, and a trough-shaped deflecting-plate disposed in said dome between said transverse perforations and the opening in the drum.

3. In a device of the class described, an oil-reservoir, an inclosing drum movably connected to said oil-reservoir, and having an aperture in its lower part, a burner connected to said reservoir and extending through said aperture into said drum, a perforated plate covering said aperture outside of the area occupied by said burner member, perforated air-chambers opening upwardly and adapted to be closed by the drum when in operative position, and ducts leading from said air-chamber to the burner through which the air is supplied thereto, substantially as specified.

In testimony that I claim the foregoing as my own I have hereto affixed my signature in the presence of two witnesses.

CASTLE BANKS CLARK.

Witnesses:
W. R. WHITLOCK,
JAMES HARLAN.